US008819635B2

(12) United States Patent
Pistoia et al.

(10) Patent No.: US 8,819,635 B2
(45) Date of Patent: *Aug. 26, 2014

(54) CONFIDENCE-BASED STATIC ANALYSIS

(71) Applicant: International Business Machines Corporation, Armonk, NY (US)

(72) Inventors: Marco Pistoia, Anawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,495

(22) Filed: Mar. 11, 2013

(65) Prior Publication Data

US 2013/0198724 A1 Aug. 1, 2013

Related U.S. Application Data

(63) Continuation of application No. 12/895,470, filed on Sep. 30, 2010, now Pat. No. 8,490,057.

(51) Int. Cl.
*G06F 9/44* (2006.01)

(52) U.S. Cl.
USPC .......................................... 717/124

(58) Field of Classification Search
USPC .......................................... 717/124
See application file for complete search history.

(56) References Cited

U.S. PATENT DOCUMENTS

| 6,011,918 A * | 1/2000 | Cohen et al. ................ 717/106 |
| 2005/0055565 A1 | 3/2005 | Fournet et al. |
| 2005/0166167 A1 | 7/2005 | Ivancic et al. |
| 2007/0089092 A1 | 4/2007 | Schmidt et al. |
| 2008/0209388 A1 | 8/2008 | Llanso et al. |
| 2008/0209567 A1 | 8/2008 | Lockhart et al. |
| 2008/0276228 A1 | 11/2008 | Sreedhar |
| 2010/0205592 A1 * | 8/2010 | Sankaranarayanan et al. ............... 717/160 |
| 2010/0284527 A1 * | 11/2010 | Fink et al. ................ 379/112.06 |
| 2010/0318980 A1 * | 12/2010 | Gulwani et al. ............... 717/160 |
| 2012/0084755 A1 | 4/2012 | Pistoia et al. |

OTHER PUBLICATIONS

Murali Krishna Ramanathan et al., "Path-Sensitive Inference of Function Precedence Protocols", Proceedings of the 29th International Conference on Software Engineering, 2007, pp. 240-250, Publisher: IEEE Computer Society, Washington, DC, USA.
V. Vipindeep and P. Jalote, "Efficient Static Analysis With Path Pruning Using Coverage Data", Workshop on Dynamic Analysis (WODA 2005, May 17, 2005, St. Louis, MO, USA), 2005, pp. 1-6, International Conference on Software Engineering, Proceedings of the third international workshop on Dynamic analysis, Publisher: Association for Computing Machinery, New York, NY, USA.

(Continued)

*Primary Examiner* — Philip Wang
(74) *Attorney, Agent, or Firm* — Patterson & Sheridan, LLP (57) ABSTRACT

Systems, methods and program products are provided for confidence-based static analysis, including initiating a static analysis of computer software, associating a confidence value with a first element of the static analysis, determining a current state of the static analysis, calculating an adjusted confidence value in accordance with a confidence adjustment function as applied to the current state and the confidence value associated with the first element, associating the adjusted confidence value with a second element of the static analysis resulting from a transition from the first element, and eliminating the second element from the static analysis if the adjusted confidence value meets elimination criteria.

7 Claims, 5 Drawing Sheets

(56) References Cited

OTHER PUBLICATIONS

Rajeev Gopalakrishna, "Improving Software Assurance Using Lightweight Static Analysis", Thesis for the Degree of Doctor of Philosophy, May 2006, pp. 1-105, Publisher: Center for Education and Research in Information Assurance and Security, Purdue University, West Lafayette, IN, USA.

Wlllliam E. Howden, "Software Confidence, Computational Integrity, and Statistical Model Checking (Paper 8T1)", 11th International Software Quality Week (QW '98) Technical Program, May 26-29, 1998, San Francisco, California, USA, Abstract from <<http://www.soft.com/QualWeek/QW98/qw98.abs.html>>.

Paper and Presentation Abstracts of the 11th International Software Quality Week (QW '98) Technical Program, May 26-29, 1998, San Francisco, California, USA, <<URL:http://51.soft.com/QualWeek/QW98/gw98.abs.html>>.

Ivancic et al., Efficient SAT-based bounded model checking for software verification, Theoretical Computer Science, vol. 404, No. 3, Sep. 28, 2008, pp. 256-274, Amsterdam, Netherlands.

Zhang et al., Time-bounded model checking of infinite-state continuous-time Markov chains, 8th International Conference on Application of Concurrency to System Design, Jun. 23, 2008, Piscataway, NJ, USA, pp. 98-107.

PCT International Search report and Written Opinion dated Nov. 17, 2011 for PCT/EP2011/065412.

* cited by examiner

```
Set<AnalysisArtifact> propagate(AnalysisArtiact a, Statement from, Statement to)
{
    if (a.getConfidenceLevel() < THRESHOLD) {
        return;
    }
    Set<AnalysisArtifact> S = process(a, from);
    int confidenceDecrease = getConfidenceLoss(from);
    foreach (AnalysisArtifact a in S) {
        a.setConfidenceLevel(a.getConfidenceLevel()-confidenceDecrease);
    } foreach (AnalysisArtifact a in S) {
        if (!artifactsAtLocation.get(to).containsModuloConfidence(a)) {
            artifactsAtLocation.get(to).add(a);
        } else {
            AnalysisArtifact b =
artifactsAtLocation.get(to).getMatchModuloConfidence(a);
            if (b.getConfidenceLevel() < a.getConfidenceLevel()) {
                artifactsAtLocation.get(to).replace(b, a);
            }
        }
    }
    return S;
}
```

Fig. 3

```
public void doGet(HttpServletRequest req, HttpServletResponse res) {
  String name = getParameter("name");                    // security source
  BankDetails bankDetails = getBankDetails(name);
  String accountID = bankDetails.getAccountID();         // virtual call
  res.getWriter().println(accountID);                    // security sink
}

BankDetails getBankDetails(String name) {
  // *, ** and *** denote conditions the analysis cannot reason about precisely; the
  // analysis acts conservatively and assumes all four cases may
  // have happened.
  if (*) {
    return new BankDetailsImpl1();
  } else if (**) {
    return new BankDetailsImpl2();
  } else if (***) {
    return new BankDetailsImpl3();
  } else {
    return new BankDetailsImpl4();
  }
} abstract class BankDetails {
  ...
  String getAccountID(String name) {
    return name2accountID(name);
  }
} class BankDetailsImpl4 extends BankDetails {
  ...
  @Override
  String getAccountID(String name) {
    return name + name2serialID(name);
  }
}
```

CONFIDENCE-BASED STATIC ANALYSIS

CROSS-REFERENCE TO RELATED APPLICATIONS

This application is a continuation of co-pending U.S. patent application Ser. No. 12/895,470, filed Sep. 30, 2010. The aforementioned related patent application is herein incorporated by reference in its entirety.

BACKGROUND

Static analysis of computer software applications typically involves a degree of uncertainty. For example, where a function relies on the value of a variable to determine which of several other functions to call, and the value of the variable may only be known at run-time, static analysis cannot determine which function will be called. However, sound static analysis typically requires consideration of each of the potential paths from the calling function. When analyzing a large, complex application, a sound static analysis may end up tracking a large number of infeasible flows due to conservative control-flow judgments, the result being highly imprecise and leading to a high rate of false-positive reports.

SUMMARY

In one aspect of the invention a method, system and computer program product is provided for confidence-based static analysis to initiate a static analysis of computer software, associate a confidence value with a first element of the static analysis, determine a current state of the static analysis, calculate an adjusted confidence value in accordance with a confidence adjustment function as applied to the current state and the confidence value associated with the first element, associate the adjusted confidence value with a second element of the static analysis resulting from a transition from the first element, and eliminate the second element from the static analysis if the adjusted confidence value meets elimination criteria.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
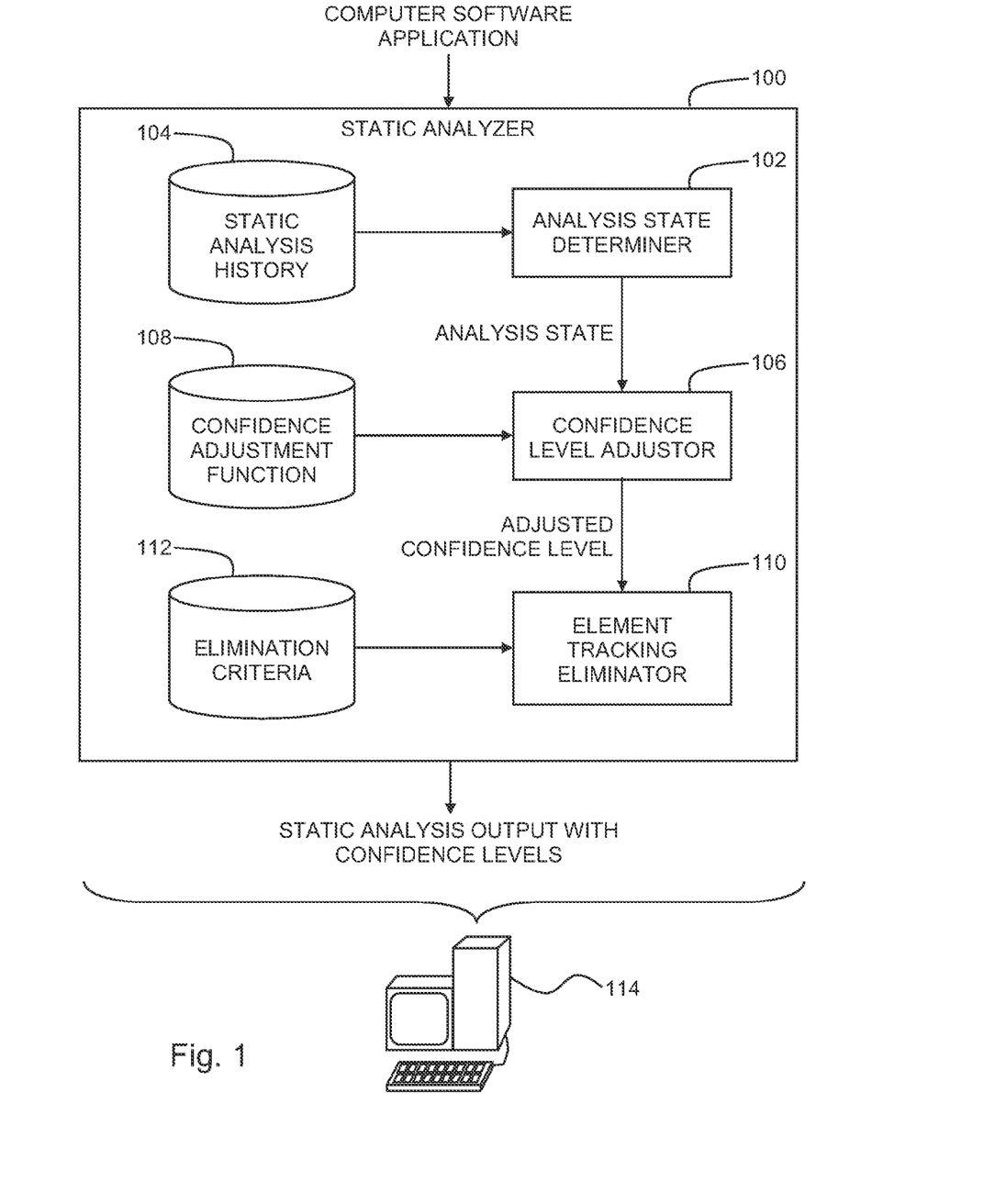
FIG. 1 is a simplified conceptual illustration of a system for confidence-based static analysis, constructed and operative in accordance with an embodiment of the invention.

Reference is now made to FIG. 1 which is a simplified conceptual illustration of a system for confidence-based static analysis, constructed and operative in accordance with an embodiment of the invention. In the system of FIG. 1, a static analyzer 100 is configured to statically analyze computer software (e.g., a computer software application), such as by analyzing the application source code or bytecode, to identify potential vulnerabilities within the application. In tracking one or more elements in a given domain, static analyzer 100 associates a starting confidence value with each seed element of the analysis, such as a value of 100.

An analysis state determiner 102 is configured to determine a current state of the static analysis, such as when performing a transition during the analysis that results in a modification of the analysis' abstract representation of the application. Analysis state determiner 102 may determine the current state of the static analysis using any method, such as by consulting a static analysis history 104 that is maintained of all the information computed and observed up to the present point in the analysis.

A confidence level adjustor 106 is configured to calculate an adjusted confidence value based on a confidence value of a tracked element, such as when static analyzer 100 reaches a transition point within the application. Confidence level adjustor 106 may calculate the adjusted confidence value by increasing the confidence value of the tracked element, decreasing it, or making no adjustment to it, all in accordance with confidence adjustment function 108 as applied to the current state of the static analysis. Confidence level adjustor 106 preferably sets the confidence value of each element resulting from the transition equal to the adjusted confidence value.

An element tracking eliminator 110 is configured to determine whether or not static analyzer 100 should continue tracking an element by applying elimination criteria 112 to the current confidence level of an element. If the confidence value of an element meets elimination criteria 112, such as where the confidence value is zero or below a given value, the element is not tracked further during the analysis.

Static analyzer 100 preferably presents the results of the static analysis via a computer-controlled output medium, such as a computer display or printout. Any item of the static analysis results may be presented along with a representation of any of the confidence values of any of the domain elements relating to the result, such as an average of the confidence values of the elements, or the lowest confidence value of any of the elements.

Any of the elements shown in FIG. 1 are preferably executed by or otherwise made accessible to a computer 114, such as by implementing any of the elements in computer hardware and/or in computer software embodied in a physically-tangible, computer-readable medium in accordance with conventional techniques.

Figure 2:
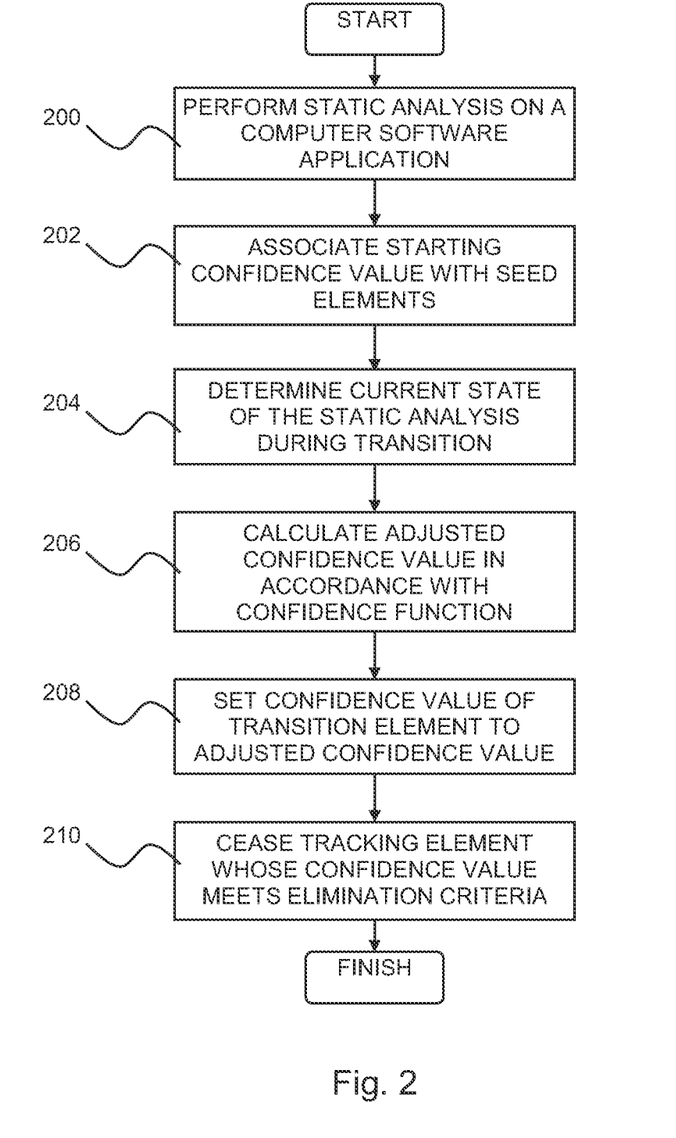
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, static analysis of a computer software application is initiated to track one or more elements in a given domain (step 200). A starting confidence value is associated with each seed element of the analysis, such as a value of 100 (step 202). The current state of the analysis is determined (step 204), such as when performing a transition during the analysis that results in a modification of the analysis' abstract representation of the application, and such as by consulting a history that is maintained of all the information computed and observed up to the present point in the analysis. An adjusted confidence value is calculated based on a confidence value of a tracked element (step 206), such as when a transition point is within the application. The adjusted confidence value may be calculated by increasing the confidence value of the tracked element, decreasing it, or making no adjustment to it, all in accordance with the confidence adjustment function as applied to the current state of the static analysis. The confidence value of each element resulting from the transition is set equal to the adjusted confidence value (step 208). If the confidence value of a domain element meets elimination criteria, such as where the confidence value is zero or below a given value, the domain element is not tracked further during the analysis (step 210).

The method of FIG. 2 may be understood by way of example, such as where it is known that static analysis of an application of a certain size will produce analysis results indicating a certain number of security vulnerabilities on average. When performing a transition during the analysis, the number of security vulnerabilities discovered thus far is checked, and if the number of discovered security vulnerabilities exceeds the expected number of discovered security vulnerabilities, the applicable confidence function may dictate that the confidence values of the resulting domain elements be decreased by a given value. In another example, when performing a transition from a virtual call site to a callee method, an associated call graph is consulted to determine how many resolutions there are for the call site. If the number of resolutions is high, then there is likely imprecision in the disambiguation of the call site, which should be reflected in the confidence value associated with the resulting domain elements, in which case the applicable confidence function may likewise dictate that the confidence values of the resulting domain elements be decreased.

Figure 3:
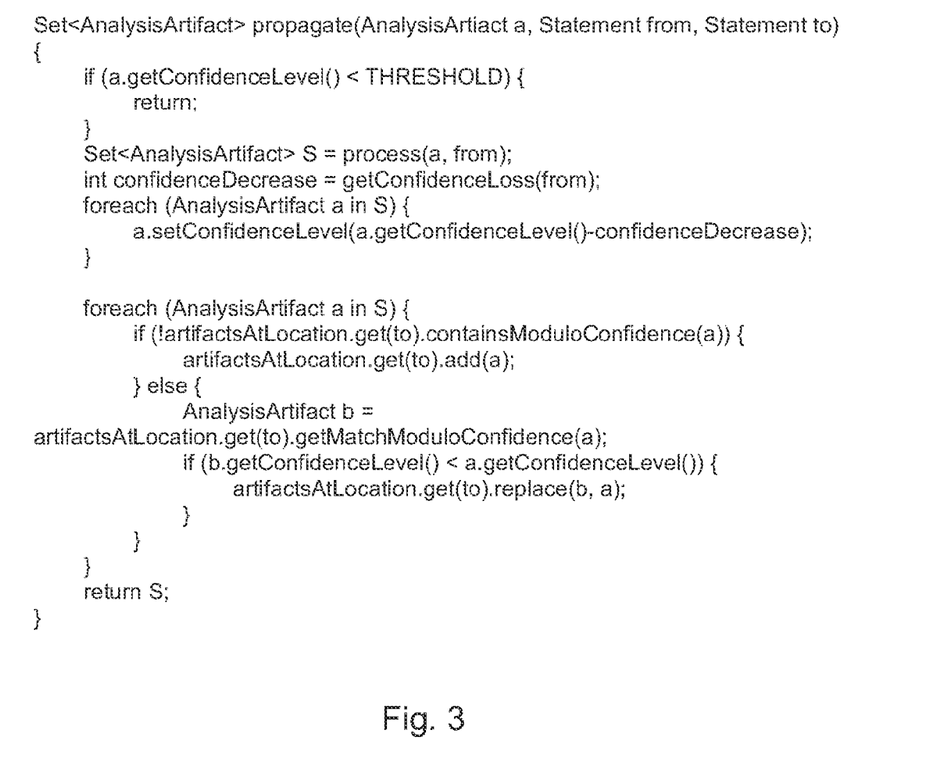
FIG. 3 is a simplified pseudo-code example of an implementation of the method of FIG. 2, operative in accordance with an embodiment of the invention.

According to one embodiment, the method of FIG. 2 may also be understood by way of a simplified pseudo-code example shown in FIG. 3, where 'AnalysisArtifact' represents an element that is tracked in a given domain. In the example of FIG. 3, information other than what is in a particular statement may be used to adjust a confidence level. For example, if the statement is a call site, then the confidence level may be adjusted based on how many resolutions there are for the call site in the program's call graph. Optionally, analysis artifacts that differ only in terms of confidence level may be merged, so as to track fewer artifacts. This is shown by the 'foreach' statement.

Figure 4:
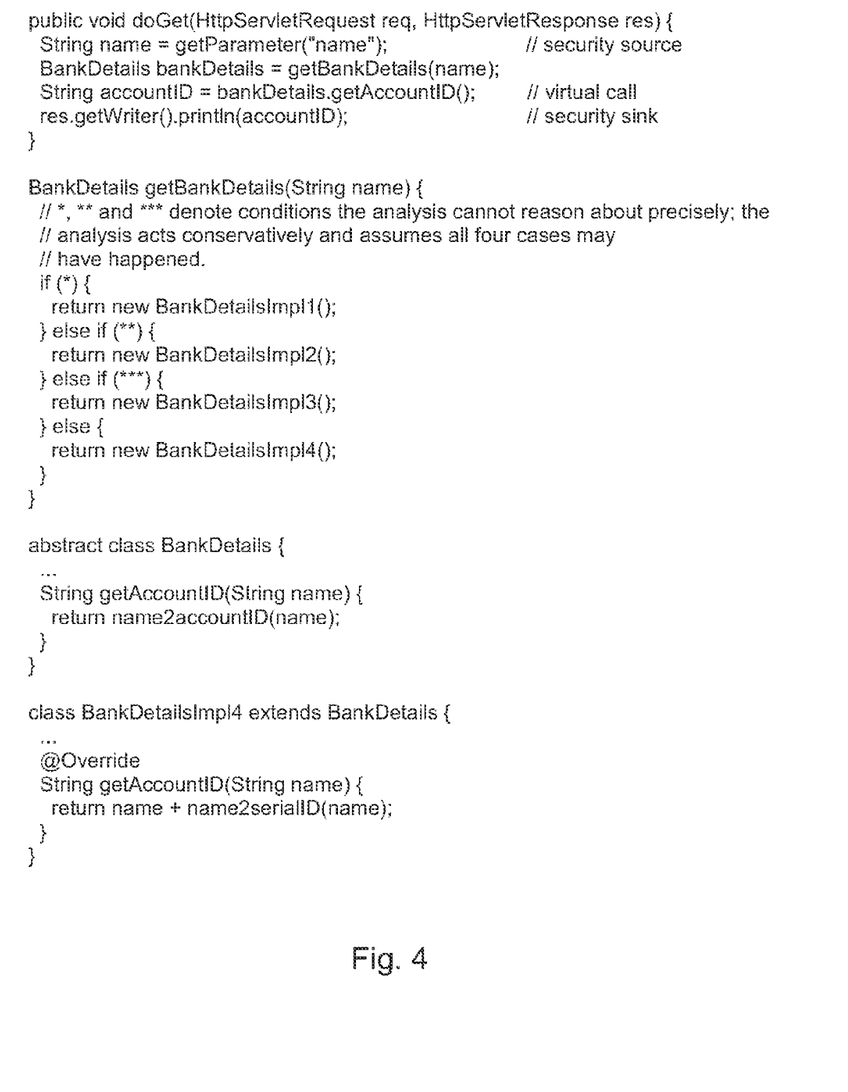
FIG. 4 is a simplified source-code example of an implementation of the method of FIG. 2, operative in accordance with an embodiment of the invention.

According to one embodiment, the method of FIG. 2 may also be understood by way of a simplified source-code example shown in FIG. 4. In the example shown, there may be a vulnerable flow from source to sink if an instance of BankDetailsImpl4 is returned through the call to getBankDetails. This is because this subclass of BankDetails overrides virtual method getAccountID, and explicitly uses the 'name' parameter in its result, as opposed to BankDetails.getAccountID, which simply maps 'name' to its corresponding account ID, which is not controlled by the attacker. By applying the method of FIG. 2, a confidence value, such as 10, is associated with 'name'. In the example, when a virtual call is encountered the confidence value decreases proportionate to the number of resolutions of the call, where each resolution has "weight" of 2. Thus, since there are 4 resolutions to the call shown, the decrease is (4−1)*2=6, resulting in the following confidence values for 'name' and 'accountID':

| name | <-> | 10 |
| accountID | <-> | 10 − 6 = 4 |

Thus, the overall flow has a relatively low confidence value of 4, which, in the example shown, reflects the certainty that the value reaching the sink was indeed tainted.

The analysis may be configured to make the following choices based on the above information:
1. It can use this information to assign a low priority to the source-to-sink flow.
2. It can stop tracking variable 'accountID' if its confidence value is below a predefined threshold value below which tainted variables are not traced.
3. It can continue tracking 'accountID', but ultimately decide to eliminate the flow from any report on the analysis results. For example, the analysis may define the confidence level associated with a flow as being the average of those associated with the source and the sink (which is 7 in the example shown), and use a special threshold value to determine whether flows should be eliminated.

Figure 5:
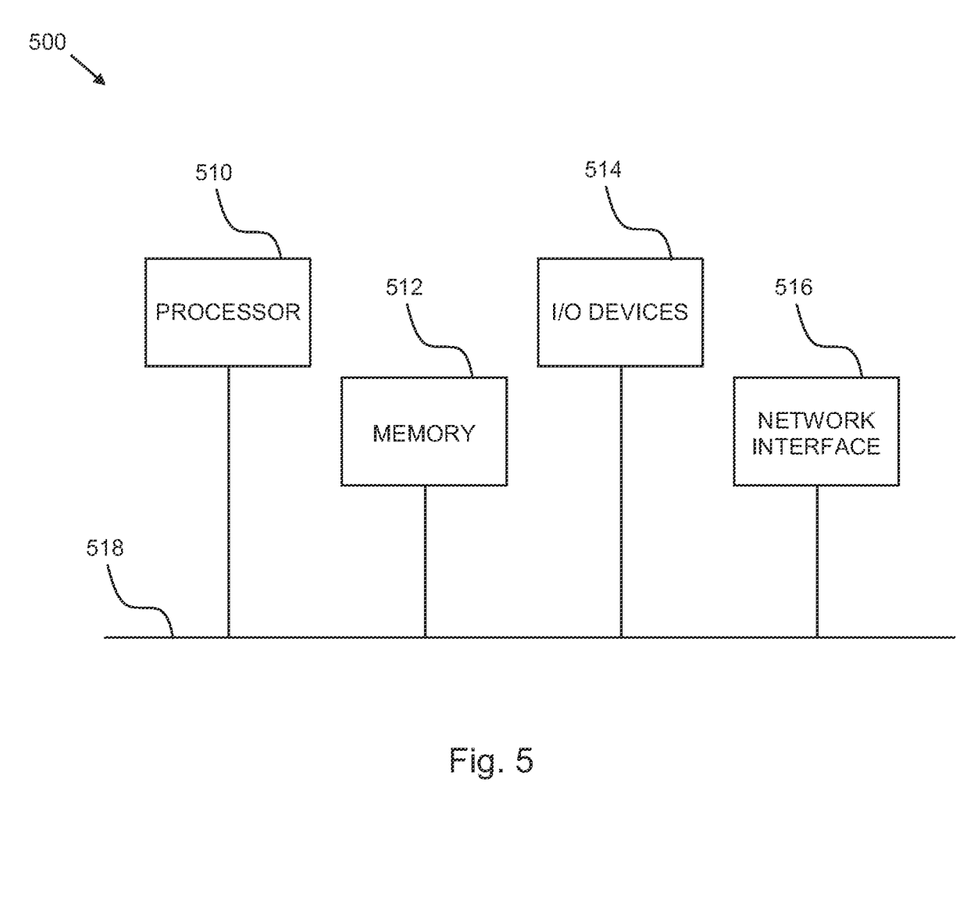
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method, comprising:
   initiating a static analysis of computer software;
   associating a confidence value with a first element of said static analysis;
   determining a current state of said static analysis;
   calculating, by operation of one or more computer processors, an adjusted confidence value in accordance with a confidence adjustment function as applied to said current state and said confidence value associated with said first element;
   associating said adjusted confidence value with a second element of said static analysis resulting from a transition from said first element; and
   eliminating said second element from said static analysis if said adjusted confidence value meets elimination criteria.

2. The method according to claim 1 wherein said determining comprises determining said current state when performing a transition during said static analysis that results in a modification of an abstract representation of said computer software.

3. The method according to claim 1 wherein said determining comprises determining said current state by consulting a history of information computed and observed during said static analysis.

4. The method according to claim 1 wherein said eliminating comprises eliminating said second element from said static analysis if said adjusted confidence value is less than or equal to a predefined elimination value.

5. The method according to claim 1, further comprising presenting a result of said static analysis via a computer-controlled output medium along with a representation of any of said confidence values of any of said elements relating to said result.

6. The method according to claim 5, wherein said presenting comprises presenting said representation as an average of said confidence values.

7. The method according to claim 5, wherein said presenting comprises presenting said representation as the lowest confidence value of any of said elements.

* * * * *